US 7,757,601 B2

(12) United States Patent
Lagares Corominas et al.

(10) Patent No.: US 7,757,601 B2
(45) Date of Patent: Jul. 20, 2010

(54) SYSTEM AND METHOD FOR COOKING-COOLING FOOD BY IMMERSION UNDER FORCED AND DIFFUSE CONVECTION

(75) Inventors: Narcis Lagares Corominas, Girona (ES); Josep Lagares Gamero, Girona (ES)

(73) Assignee: Metalquimia, S.A., Girona (ES)

( * ) Notice: Subject to any disclaimer, the term of this patent is extended or adjusted under 35 U.S.C. 154(b) by 339 days.

(21) Appl. No.: 11/596,303

(22) PCT Filed: May 13, 2004

(86) PCT No.: PCT/ES2004/000212

§ 371 (c)(1),
(2), (4) Date: Nov. 21, 2007

(87) PCT Pub. No.: WO2005/110128

PCT Pub. Date: Nov. 24, 2005

(65) Prior Publication Data

US 2008/0075821 A1    Mar. 27, 2008

(51) Int. Cl.
*A47J 27/18* (2006.01)
(52) U.S. Cl. .......................................... 99/330; 165/61
(58) Field of Classification Search ........... 99/326–333, 99/352–356, 348, 400, 401, 467–479, 483–489, 99/403, 416; 426/520–524, 506–509; 165/232–240, 165/61, 48.1; 62/61, 82, 282, 342; 392/441, 392/445, 449, 454; 126/369, 369.1, 369.2, 126/369.3, 361.1, 362.1, 344
See application file for complete search history.

(56) References Cited

U.S. PATENT DOCUMENTS

| 2,750,937 | A | * | 6/1956 | Sjolund ................... 126/369.2 |
| 2,834,865 | A | * | 5/1958 | Coates ........................ 392/454 |
| 4,003,302 | A | * | 1/1977 | Mencacci et al. ............. 99/359 |
| 4,505,192 | A | * | 3/1985 | Dreano ........................ 99/330 |

(Continued)

FOREIGN PATENT DOCUMENTS

EP            995386 A       4/2000

(Continued)

OTHER PUBLICATIONS

International Search Report for PCT International Application PCT/ES2004/000212 mailed Nov. 11, 2004.

*Primary Examiner*—Geoffrey S Evans
(74) *Attorney, Agent, or Firm*—RatnerPrestia (57) ABSTRACT

The invention relates to a system and method for the immersion cooking/cooling of food in diffused forced convection. The inventive system comprises: a tank for housing the food to be cooked/cooled, filling/emptying means for filling the vessel with a cooking or cooling liquid and emptying same, and heating means for heating the liquid. The tank comprises a lower region and an upper region, and circulation means which are intended: (i) to collect liquid from the lower region by means of various outlets in a first lower side wall and to introduce said liquid into the upper region through various inlets in a first upper side wall, and (ii) to collect liquid from the upper region by means of various outlets in a second upper side wall and to introduce said liquid into the lower region through various inlets in a second lower side wall, thereby generating diffused forced convection in a turbulent flow.

19 Claims, 4 Drawing Sheets

U.S. PATENT DOCUMENTS

| | | | | |
|---|---|---|---|---|
| 5,005,471 | A | * | 4/1991 | Dreano .......................... 99/330 |
| 5,280,748 | A | * | 1/1994 | Pardo ........................... 99/330 |
| 5,281,426 | A | * | 1/1994 | Pardo ........................... 426/232 |
| 5,398,600 | A | * | 3/1995 | Madsen et al. ................ 99/477 |
| 5,685,125 | A | * | 11/1997 | Cattelli et al. ................. 53/127 |
| 6,085,639 | A | * | 7/2000 | Dreano .......................... 99/330 |

FOREIGN PATENT DOCUMENTS

| | | |
|---|---|---|
| ES | 8301603 A | 4/1983 |
| ES | 2037458 T | 6/1993 |
| WO | WO 03/096815 A1 | 11/2003 |
| WO | WO 2005/095744 A1 | 10/2005 |

* cited by examiner

SYSTEM AND METHOD FOR COOKING-COOLING FOOD BY IMMERSION UNDER FORCED AND DIFFUSE CONVECTION

This application is a U.S. National Phase application of PCT International Application No. PCT/ES2004/000212 filed May 13, 2004.

FIELD OF THE INVENTION

The present invention generally relates to a system and method for cooking-cooling food by immersion under forced and diffuse convection and more specifically to a system and method for cooking-cooling food arranged in molds housed in support trays stacked inside a tank adapted to be filled and emptied with a cooking or cooling liquid subjected to a forced and diffuse convection in turbulent flow.

BACKGROUND OF THE INVENTION

International patent application WO 03/096815, of this applicant, discloses an instillation for cooking-cooling food comprising a plurality of tanks which are used to receive the food to be cooked, and automatic means for loading and unloading said food through a side loading and unloading opening existing in each of said tanks, said opening of each tank being equipped with a hermetically sealing side sliding door. The installation includes means for filling each tank with at least one cooking or cooling liquid, and means for subsequently emptying it. Each tank includes means for heating the cooking liquid therein, for example, by bubbling steam through the cooking liquid, although optionally the cooking liquid can be totally or partially pre-heated.

International patent application PCT/ES 2004/000145, of this applicant, describes a hermetically sealing side sliding door that is able to withstand internal pressure and is suitable to be applied to the tanks of the installation described above.

The food to be cooked and/or cooled is preferably arranged in molds housed in support trays stacked inside each tank, preferably forming at least one lower stack and at least one upper stack supported in corresponding lower and upper supporting means inside the tank. In the mentioned prior document, the cooking or cooling of the food is carried by a traditional system.

In this traditional model, a stack of product molds is deposited in a tempered hot water bath, where the transfer of heat to the product is virtually static; i.e. almost exclusively by heat conduction. Furthermore, most of the elements involved in the system have a high specific heat, as corresponds to water and especially the equivalent of the product, since in addition to its merely physical heat capacity, the heat energy required by the physical and chemical cooking reactions is also considered. There is only a minor heat transfer by the more effective heat convection method (due to the movement of the surrounding water, not of the product) which consists of two types, alternatively: by natural convection, in which slightly cooled water tends to move downwards to the bottom due to its greater density; and by the replacement of hot water intended to temper the water of the cooking bath.

However, the limited proportion of metal in the product mold in contact with the heating or cooling water makes natural convection affect a minimal surface of the total surface corresponding to all of the molds in the basket. Even the existence of narrow water channels between the inner vertical walls of the mold in the basket does not entail a significant additional advantage because they are long, narrow and above all, horizontal, virtually any natural convection being prevented and the stagnant water of such channels acting as a mere heat conducting element.

With respect to the most efficient manner of transferring heat from a hot focus to a cold one, which is transfer by radiation (proportional to the difference between the absolute temperatures to the power of four), it virtually does not exist in this system, in which there are no significant temperature gradients between parts.

Therefore, with the traditional system, the cooking process as well as the cooling process (although the latter in a minor extent because there is no chemical reaction heat involved with the product but only the sensible heat of the product) are very slow.

Although the installation described in the mentioned document prevents other drawbacks associated to the amount and slowness of the necessary manual operations in a conventional process where the product cells are introduced and extracted through the upper part of the water tubs by raising and immersing them, and in triplicate: first in hot water baths, then in water at room temperature and finally in cooled water, the drawbacks associated to the mentioned natural convection movement of the liquid persist, which movement has been shown to be insufficient for ensuring a fast and efficient heat exchange between the liquid and the food in different regions of the tank.

The present invention provides a system and a method for cooking-cooling food by immersion under forced and diffuse convection in turbulent flow that is able to maximize the heat exchange and optimize the heat efficiency of the process, providing an effective reduction of the energy costs and a regular cooking-cooling process.

SUMMARY OF THE INVENTION

The present invention contributes to achieve the previous and other objectives by means of a system for cooking-cooling food by immersion under forced and diffuse convection, of the type comprising at least one tank for housing the food to be cooked-cooled, filling means for filling said tank with a cooking or cooling liquid, emptying means for draining said cooking or cooling liquid from the tank, and heating means for heating the cooking or cooling liquid. The system is characterized in that the tank comprises at least one lower region and one upper region, circulating means being arranged for taking in cooking or cooling liquid from the inside of said lower region through at least one lower outlet located in a first lower side wall of the lower region and introducing it inside said upper region through at least one upper inlet located in a first upper side wall of the upper region and for taking in cooking or cooling liquid from the inside of the upper region through at least one upper outlet located in a second upper side wall of the upper region and introducing it inside the lower region through at least one lower inlet located in a second lower side wall of the lower region.

The first lower side wall is preferably opposite to and facing said second lower side wall, whereas said first upper side wall is opposite to and facing said second upper side wall, thus facilitating a transverse circulation of the cooking or cooling liquid in both the upper and lower regions in opposite directions. To contribute to the diffusion of the flow of said transverse circulation, the system comprises a plurality of said lower outlets distributed in a significant area of said first lower side wall of the lower region, a plurality of said upper inlets distributed in a significant area of said first upper side wall of the upper region, a plurality of said upper outlets distributed in a significant area of said second upper side wall of the upper region, and a plurality of said lower inlets distributed in a significant area of said second lower side wall of the lower region. Furthermore, the lower outlets are connected to the upper inlets through at least one first duct and the upper outlets are connected with the lower inlets through at least one second duct.

To force a turbulent transverse circulation of the cooking or cooling liquid in the lower and upper regions of the tank, the system includes pumping means connected so as to propel the cooking or cooling liquid inside said first duct. The aforementioned heating means can be outside the tank, therefore the cooking liquid would be introduced already heated to the tank, or they can be arranged to heat the cooking liquid inside than tank, or a combination of both. The system can optionally include cooling means, usually outside the tank, to cool the cooling liquid. When the heating means are inside the tank, they preferably comprise a plurality of lower steam inlets arranged to bubble steam through the cooking liquid inside the lower region of the tank and a plurality of upper steam inlets arranged to bubble steam through the cooking liquid inside upper region, said lower steam inlets being adjacent to said lower liquid outlets and said upper steam inlets are arranged adjacent to said upper liquid outlets.

A plate adapted to restrict the vertical circulation of the cooking or cooling liquid is interposed between the lower region and the upper region of the tank. However, this plate comprises perforations to allow the draining of the cooking or cooling liquid from both the lower and upper regions by the emptying means, which are arranged in relation to the lower region of the tank.

On the other hand, the tank comprises lower supporting means for supporting a lower stack of support trays inside the lower region and upper supporting means for supporting an upper stack of said support trays inside the upper region. The mentioned support trays are adapted to support the food to be cooked-cooled, preferably arranged in molds. The mentioned lower and upper stacks are sized so as to leave reduced spaces therearound inside the tank to contribute to accelerate and direct the transverse circulation of the cooking or cooling liquid. Furthermore, each support tray includes, for example, a double bottom joined at its bottom by transverse partitions for the purpose of delimiting spaces facilitating the transverse circulation of the cooking or cooling liquid from one side of the support tray to the other even when the support tray forms part of one of the lower or upper stacks in one or the other of the lower and upper regions of the tank.

The tank of the system of the present invention is preferably of the type having a side loading-unloading opening with a hermetically sealing side sliding door, and is applicable to the installation described in the aforementioned international patent application WO 03/096815, of this applicant. However, the system of the present invention can also be applied to a tank with an upper loading-unloading opening.

The present invention also provides a method for the cooking-cooling of food by immersion under forced and diffuse convection, of the type comprising arranging the food to be cooked-cooled inside at least one tank; filling said tank with a cooking or cooling liquid; optionally heating said cooking or cooling liquid inside the tank; and draining the cooking or cooling liquid from the tank, said method being characterized in that it further comprises taking in cooking or cooling liquid from the inside of a lower region of the tank through at least one lower outlet located in a first lower side wall of said lower region; and introducing it inside an upper region of the tank through at least one upper inlet located in a first upper side wall of said upper region; and taking in cooking or cooling liquid from the inside of the upper region through at least one upper outlet located in a second upper side wall of the upper region and introducing it inside the lower region through at east one lower inlet located in a second lower side wall of the lower region.

The method of the present invention preferably comprises facilitating a transverse circulation in opposite directions of the cooking or cooling liquid in the lower region and in the upper region, respectively, by arranging said first lower side wall opposite to and facing said second lower side wall and said first upper side wall opposite to and facing said second upper side wall. The method also comprises diffusing said transverse circulation of the cooking or cooling liquid by arranging a plurality of said lower outlets distributed in a significant area of the first lower side wall of the lower region, a plurality of said upper inlets distributed in a significant area of the first upper side wall of the upper region, a plurality of said upper outlets distributed in a significant area of the second upper side wall of the upper region, and a plurality of said lower inlets distributed in a significant area of the second lower side wall of the lower region.

The method also comprises forcing a turbulent transverse circulation of the cooking or cooling liquid in the lower and upper regions of the tank by connecting the lower outlets with the upper inlets through at least one first duct, connecting the upper outlets with the lower inlets through at least one second duct, and propelling the cooking or cooling liquid at least inside said first duct by means of pumping means. The method also comprises restricting a vertical circulation of the cooking or cooling liquid between the lower region and the upper region of the tank by interposing a plate therebetween, allowing at the same time to drain the cooking or cooling liquid from both the lower and upper regions by emptying means arranged in relation to the lower region of the tank by providing perforations in said plate.

The system and/or method of the present invention achieves maximizing the heat exchange and optimizing the heat efficiency of the process, providing an effective reduction of the energy costs and a highly regular cooking-cooling process, resulting in a microbiologically safe food product with a high organoleptic quality.

With the system and method of the present invention, in addition to the reduction in the mechanical movement times provided by the document cited above, there is a significant reduction in the cooking and cooling time, because the proportion of heat transfer by forced convection increases upon stirring the hot or cold inner water by internal closed recirculation. Furthermore, the new system can achieve an energy and operational advantage with respect to traditional systems. Thus, when heat is transferred from heated water to the product, in the case of cooking, and from the product to the cooling water, in the case of cooling, by forced convection of the water in turbulent flow, the heat transfer times can be reduced by one-fifth or one-sixth (provided that the rate of heat transfer does not affect to the chemical, physical and biochemical reactions required for the better quality of the product). Therefore, in an installation with several tanks in which a sequential processing is carried out, one or more of the first tanks can be ending the total process even before it has started in the last tanks, enabling a consequent transfer of self-stored hot and cold water in the new production tanks. A nocturnal tempering may be unnecessary by providing a good internal insulation of the tanks. The pre-cooling water from the main water supply can even be ecologically re-used and its consumption reduced if sufficient tanks are available for storing it.

From a heating energy point of view, the system and method of the present invention involves 100% use of the energy (enthalpy) of the steam, given that the latter is mixed directly by injection with the cooking water, preventing the losses corresponding to the steam-water heat transfer in heat exchangers, plus the corresponding and inevitable heat losses (despite a suitable heat insulation) in the operation and control equipment, long pipes and large, necessarily outer deposit for accumulating and tempering the cooking water.

From a productivity point of view, the system and method of the present invention provides a considerable decrease of the cooking and cooling time, given that now they are not carried out by simple static natural convection and heat conduction, but by the stirring of the water caused by the internal recirculation forced by pumping. The injection of steam further allows a fast heating of water for cooking (a prior tempering is not strictly required), plus an additional thermodynamic stirring thereof caused by holes in a device for the ejection of steam under high pressure and temperature, which additionally increases the cooking speed required. In an installation like the one described in the cited document, and equipped with the system and method of the present invention, this considerable increase in the speed and efficiency of the heat transfer is reinforced by an optional design of the molds corresponding to each product, which cause a pronounced increase in the heat and cold transmission coefficient due to the turbulent and fast passage of water through suitably design new conductions and narrowings provided in the stacks of support trays. This considerable increase in the speed and efficiency of heat transfer due to heat transmission by forced and diffuse convection also provides a great heat regularity within the entire boiler, thus ensuring the consistency and regularity of the heat process, thus guaranteeing the quality and the microbiological safety of the final food product.

Additionally, the decrease of the daily production time provided by the application of the present invention opens up the possibility of making good use of most of the calories contained in the hot water after cooking and frigories contained in the cold water after cooling by storing it in the production boilers themselves, without requiring the large outer deposits for storing and tempering the necessary fluids for the production of the following day in many traditional installations.

With well experienced concepts of the present invention, in the event of its application in a plant which does not have steam generation systems because it is not needed in other production operations, there could be an energy and investment saving in auxiliary equipment of the order of 30% to 40%, using electronic heat pumps with a variable cooling output instead of the specific installation of a pirotubular boiler generating saturated steam at 4-6 bar.

BRIEF DESCRIPTION OF THE DRAWINGS

The previous and other advantages and features of the present invention will be more clearly shown in the following detailed description of an embodiment with reference to the attached drawings in which.

DETAILED DESCRIPTION OF THE INVENTION

Figure 1:
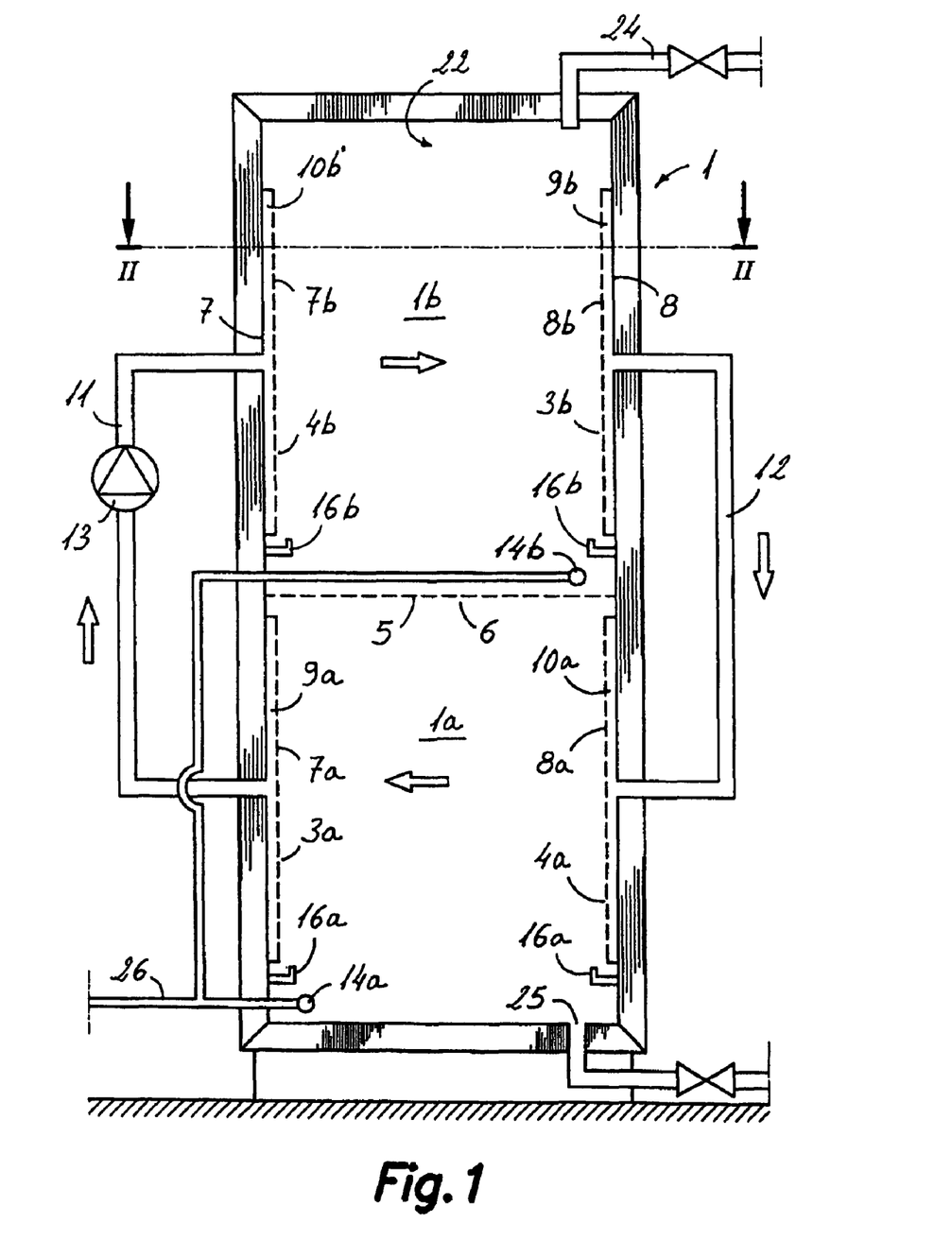
FIG. 1 is a schematic front elevational view of a tank according to an embodiment of the system of the present invention.
Figure 1A:
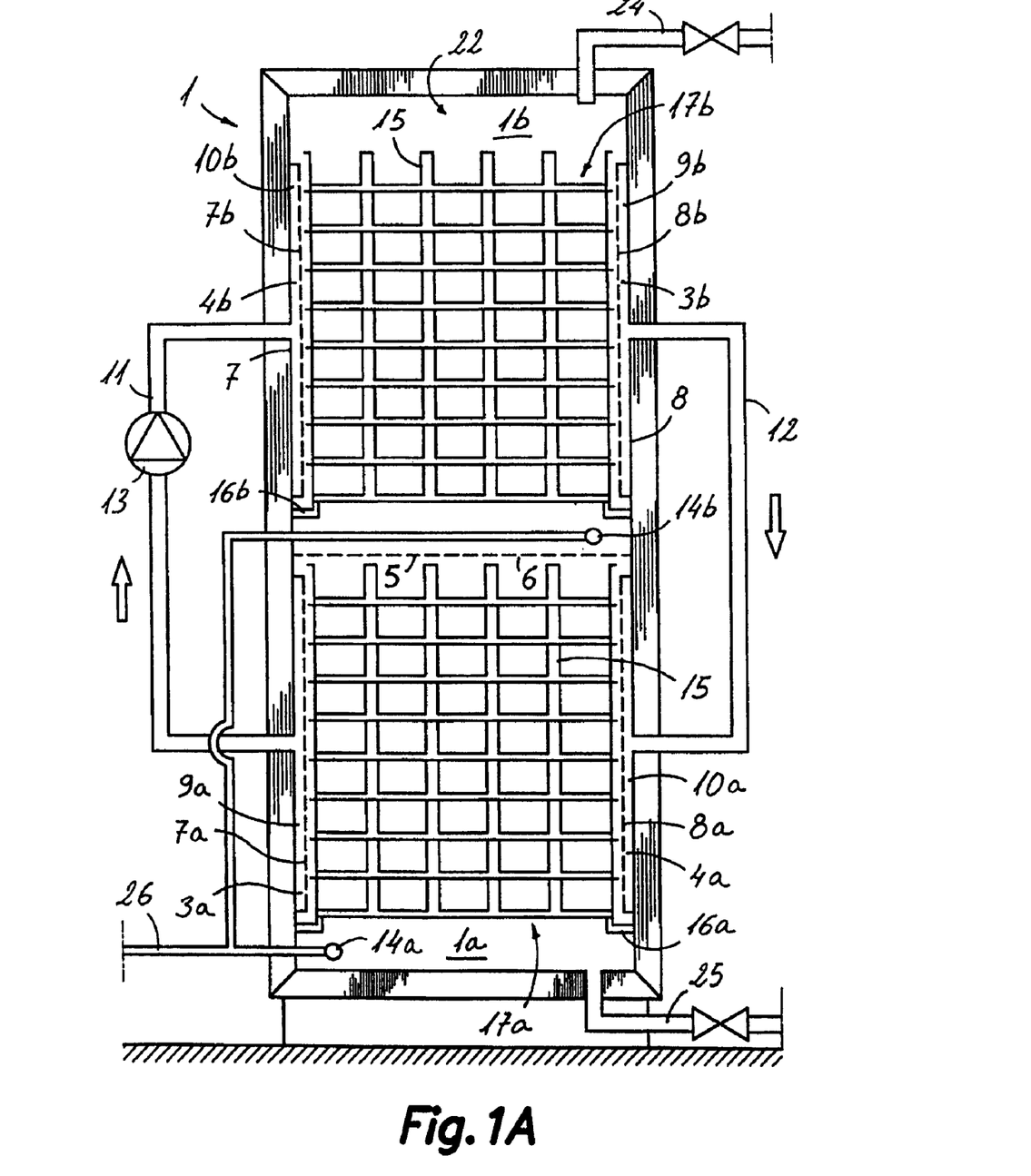
FIG. 1A is a schematic view similar to that of FIG. 1 showing stacks of support trays for food to be cooked-cooled loaded inside tank 1.
Figure 2:
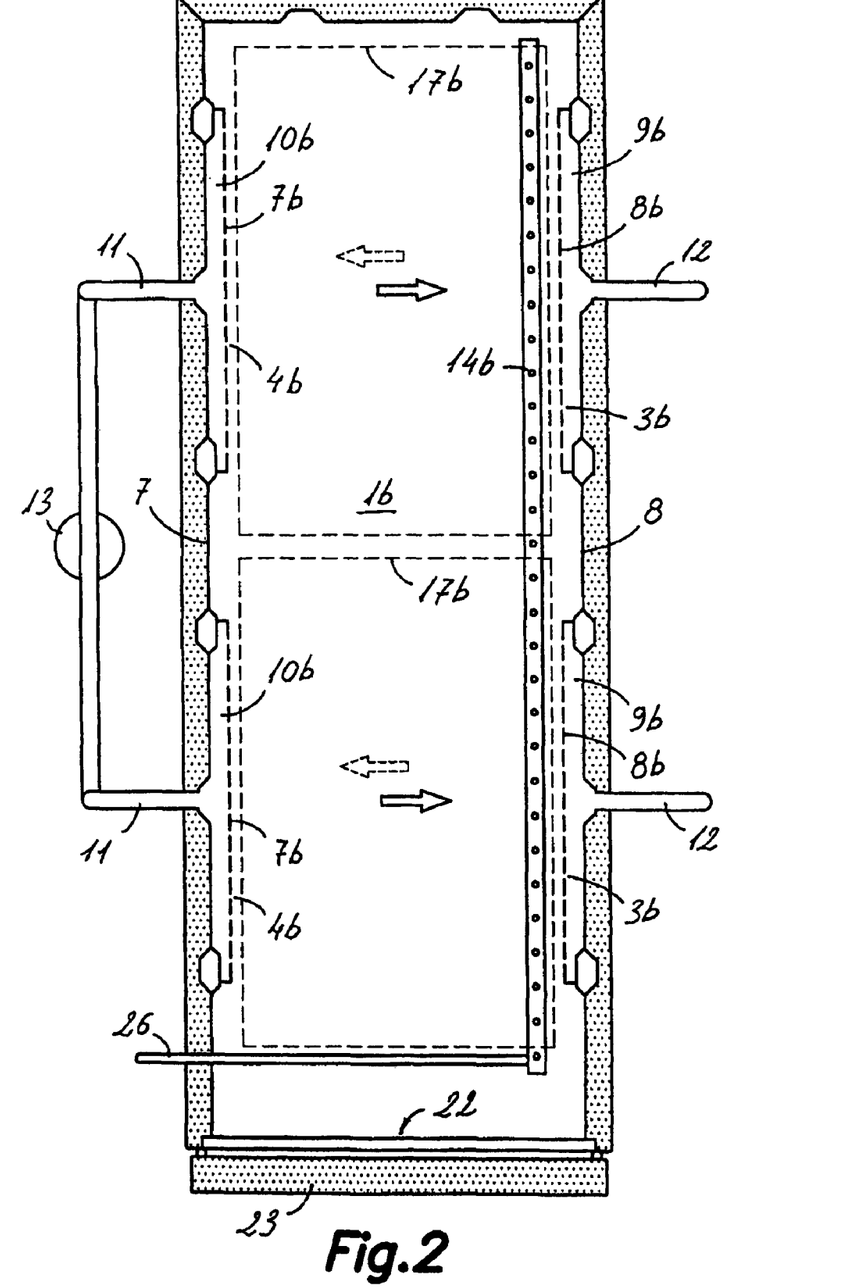
FIG. 2 is a schematic cross-section view taken through the plane II-II of FIG. 1.

Referring first to FIGS. 1 and 2, reference numeral 1 generally indicates a tank or boiler forming part of the system for cooking-cooling food by immersion under forced and diffuse convection of the present invention. The mentioned tank 1 is designed to house the food which will be subjected to a cooking and subsequent cooling treatment, or cooking alone, or cooling alone, or another treatment, such as for example, pasteurization. The food to be treated is typically housed in metal molds arranged in support trays 15 stacked in different stacks 17a, 17b, as shown in FIG. 1A and as will be explained below in relation to FIGS. 4 and 5.

The mentioned tank 1 can form part of an installation like the one described in the mentioned international patent application WO 03/096815, of this applicant, and it preferably has a side loading and unloading opening 22 provided with a hermetically sealing side sliding door 23 (FIG. 2) that is able to withstand internal pressure, such as for example, the one described in the mentioned international patent application PCT/ES 2004/000145, of this applicant. Nevertheless, the system and method of the present invention can also be applied to a tank with an upper loading-unloading opening.

The tank 1 is provided with filling means 24 for filing said tank 1 with a cooking or cooling liquid and emptying means 25 for draining said cooking or cooling liquid from tank 1. These filling and emptying means 24, 25 can usually comprise conduits, valves and pumping means for connecting the tank with other tanks, deposits, other liquid sources, drains, etc. the installation can include heating means and cooling means for heating or cooling the liquid before it is introduced in the tank. In the embodiment shown in the figures, tank 1 includes heating means for heating the liquid inside the tank which comprise, as is known, a series of steam inlets 14a, 14b arranged to bubble steam through the cooking liquid inside tank 1. These steam inlets 14a, 14b are incorporated in steam nozzles located strategically inside tank 1 and connected to a steam supply conduit 26. However, these heating means inside tank 1 are not essential for the application of the system and method of the present invention.

Tank 1 comprises a first outer side wall 7 and a second outer side wall 8 opposite to and facing the first one, and at least two distinguished regions: a lower region 1a and an upper region 1b having respective first lower side wall 7a and first upper side wall 7b associated to said first outer side wall 7 and respective second lower side wall 8a and second upper side wall 8b associated to said second outer side wall 8. There is a lower outlet chamber 9a formed between the first lower side wall 7a and the first outer side wall 7 of tank 1, which chamber is communicated through a first duct 11 with an upper inlet chamber 10b formed between the first upper side wall 7b and the first outer side wall 7. In a similar manner, there is an upper outlet chamber 9b between the second upper side wall 8b and the second outer side wall 8, which chamber is communicated through a second duct 12 with a lower inlet chamber 10a formed between the second lower side wall 8a and said second outer side wall 8.

Each of the first and second lower side walls 7a, 8a of the lower region 1a and of the first and second upper side walls 7b, 8b of the upper region 1b are carried out in respective plates, each of which incorporates a plurality of holes forming corresponding lower outlets and inlets 3a, 4a and upper outlets and inlets 3b, 4b. Pumping means 13 are connected to said first duct 11 to propel the cooking or cooling liquid therein for the purpose of establishing a transverse circulation of the cooking or cooling liquid inside the upper and lower regions 1a, 1b of the tank. This circulation is established by taking in the cooking or cooling liquid from the inside of the lower region 1a through the lower outlets 3a located in the first lower side wall 7a and introducing it inside said upper region 1b through the upper inlets 4b located in the first upper side wall 7b, and taking in cooking or cooling liquid from the inside of the upper region 1b through the upper outlets 3b located in the second upper side wall 8b and introducing it inside the lower region 1a through the lower outlets 4a located in the second lower side wall 8a.

The mentioned pumping means 13 are adapted and sized so as to force a turbulent circulation of the cooking or cooling liquid inside the lower and upper regions 1a, 1b of tank 1. As indicated by means of arrows in FIG. 1, the transverse circulation of the cooking or cooling liquid in each of the lower and upper regions 1a, 1b preferably occurs in opposite directions. In FIG. 2, the continuous line arrows indicate the circulation in the upper region 1b whereas the dotted line arrows indicate the circulation in the lower region 1a in an opposite direction. This transverse circulation forms a forced and diffuse convection in turbulent flow.

Figure 3:
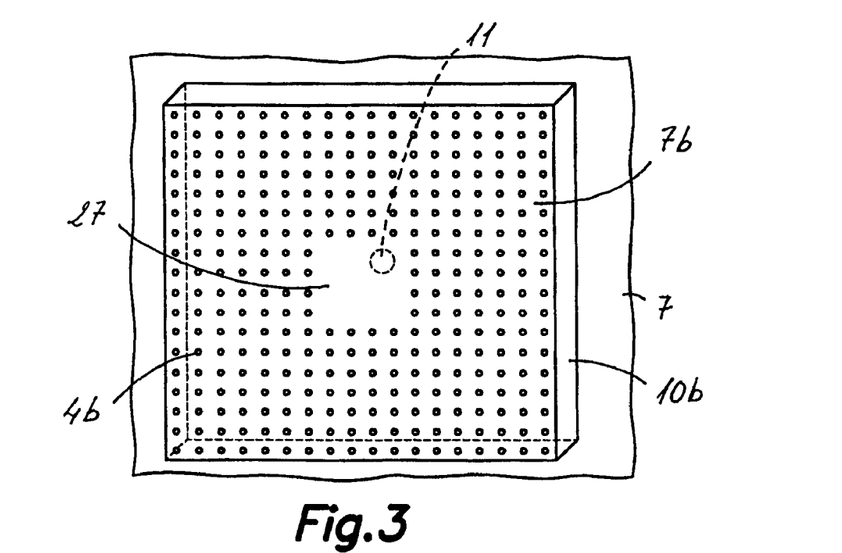
FIG. 3 is a schematic view of a plate with a plurality of liquid outlets forming a side wall of one of the regions of the tank of FIG. 1.

For the purpose of diffusing the mentioned transverse circulation in both the upper and lower regions 1a, 1b of tank 1 as much as possible, the lower outlets and inlets 3a, 4a and the upper outlets and inlets 3b, 4b are distributed in a significant area of their corresponding first and second lower side walls 7a, 8a and first and second upper side walls 7b, 8b. FIG. 3 shows, by way of example, a possible distribution of the upper inlets 4b of a plate forming the upper side wall 7b. It will be observed that the upper inlets 4a comprise a large number of small holes distributed regularly on the entire plate except in a central area 27 which is facing the outfall of the duct 11 in the upper inlet chamber 10b. Thus, a jet of cooking or cooling liquid leaving duct 11 collides with said hole-free central area 27 and the flow is distributed throughout the entire upper inlet chamber 10b until it leaves through the holes 4a in a substantially uniform manner. The plates forming the remaining side walls 7b, 8a, 8b of the upper and lower regions 1a, 1b have similar dimensions and have a similar configuration and distribution of holes.

The vertical circulation of the cooking or cooling liquid between the lower region 1a and the upper region 1b of tank 1 is restricted by a plate 5 interposed between them. As will be observed in FIG. 1, the mentioned emptying means 25 are arranged in relation to the lower region 1a of tank 1, and said plate 5 comprises perforations 6 to allow the draining by gravity of the cooking or cooling liquid from both the lower and upper regions 1a, 1b through the emptying means 25.

Each of the lower and upper regions 1a, 1b is provided with one of the mentioned steam nozzles. Thus, a lower steam nozzle comprises a plurality of lower steam inlets 14a arranged to bubble steam through the cooking liquid close to the lower outlets 3a inside the lower region 1a of tank 1, and an upper steam nozzle comprises a plurality of upper steam inlets 14b arranged to bubble steam through the cooking liquid close to the upper outlets 3b inside the upper region 1b. This arrangement prevents the formation of pockets of steam that are detrimental to the cooking process because the steam is mixed with the cooking liquid in the lower and upper intake inlets 3a, 3b in the respective lower and upper regions 1a, 1b.

Figure 4:
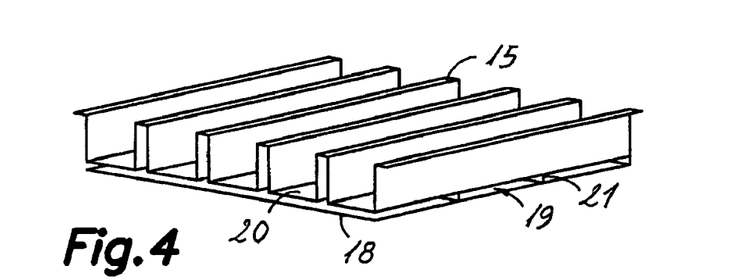
FIG. 4 is a perspective view of a support tray for supporting food to be cooked-cooled.
Figure 5:
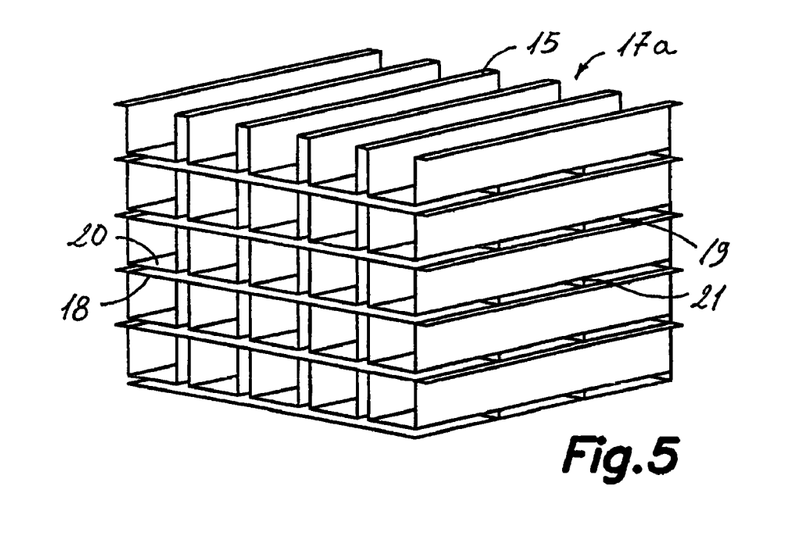
FIG. 5 is a perspective view of a stack of support trays to be introduced in one of the regions of the tank of FIG. 1.

In reference to FIG. 4, this figure shows one of the mentioned support trays 15 for supporting the food to be cooked-cooled. The support trays 15 are designed to be stacked forming stacks 17a, 17b (one of which is shown in FIG. 5) that are suitable for being handled by automatic handling means and for being loaded and unloaded inside tank 1, as described in the cited international patent application WO 03/096815. To that end and as shown in FIGS. 1 and 1A, tank 1 comprises lower supporting means 16a for supporting one or more lower stacks 17a of support trays 15 inside the lower region 1a and upper supporting means 16b for supporting one or more upper stacks 17b of support trays 15 inside the upper region 1b. In the embodiment shown in FIG. 2, tank 1 has depth that is enough to house two lower stacks 17a in the lower region 1a and two upper stacks 17b (shown by means of dotted lines) in the upper region 1b. Accordingly, the circulation means comprise two lower outlet chambers 9a (not shown) communicated through respective first ducts 11 with two respective upper inlet chambers 10b, and two upper outlet chambers 9b communicated through respective second ducts 12 with two respective lower inlet chambers 10a (not shown), for the purpose of generating the transverse circulation of the liquid mainly where the lower and upper stacks 17a, 17b are housed. The two first ducts 11 can meet at their middle part for the installation of a single pump 13.

As can be observed in FIG. 1A, the lower and upper stacks 17a, 17b are sized to leave reduced spaces therearound inside tank 1 to contribute to accelerate and direct the circulation of the cooking or cooling liquid. It is evident that the depth of the tank can be enough for a single stack in each region or for more than two. The tank could also be easily extended to more than two regions in the vertical direction by means of one or more additional dividing plates and a corresponding adaptation of the liquid circulation means and heating means.

To facilitate the transverse circulation of the cooking or cooling liquid from one side of the support tray 15 to the other, even when the support trays 15 form part of one of the lower or upper stacks 17a, 17b in one or the other of the lower and upper regions 1a, 1b of tank 1, each support tray 15 (FIG. 4) includes at least one configuration comprising at least one double bottom 18 joined to a bottom 20 of the support tray 15 by transverse partitions 21 delimiting spaces 19 for the transverse circulation of the cooking or cooling liquid. Thus, each lower or upper stack 17a, 17b (one of which is shown in FIG. 5) comprises multiple transverse passages allowing the circulation of the liquid therethrough.

The present invention also comprises a method suitable to be carried out by means of the system described above. The method for cooking-cooling food by immersion under forced and diffuse convection according to the present invention comprises well known steps, such as first arranging the food to be cooked-cooled inside at least one tank 1, filling said tank with a cooking or cooling liquid, optionally heating said cooking or cooling liquid inside tank 1 in the event of cooking, and only if necessary, and finally draining the cooking or cooling liquid from tank 1. The method of the invention also comprises taking in cooking or cooling liquid from the inside of a lower region 1a of tank 1 through at least one lower outlet 3a located in a first lower side wall 7a of said lower region 1a, and introducing it inside an upper region 1b of tank 1 through at least one upper inlet 4b located in a first upper side wall 7b of said upper region 1b, and simultaneously taking in cooking or cooling liquid from the inside of the upper region 1b through at least one upper outlet 3b located in a second upper side wall 8b of the upper region 1b and introducing it inside the lower region 1a through at least one lower inlet 4a located in a second lower side wall 8a of the lower region 1a. The method further comprises facilitating a transverse circulation in opposite directions of the cooking or cooling liquid in the lower region 1a and in the upper region 1b respectively, by arranging said first lower side wall 7a opposite to and facing said second lower side wall 8a and said first upper side wall 7b opposite to and facing said second upper side wall 8b.

For the purpose of diffusing said transverse circulation of the cooking or cooling liquid, the method comprises arranging a plurality of said lower outlets 3a distributed in a significant area of the first lower side wall 7a of the lower region 1a, a plurality of said upper inlets 4b distributed in a significant area of the first upper side wall 7b of the upper region 1b, a plurality of said upper outlets 3b distributed in a significant area of the second upper side wall 8b of the upper region 1b, and a plurality of said lower inlets 4a distributed in a significant area of the second lower side wall 8a of the lower region 1a. The method also comprises forcing a turbulent transverse circulation of the cooking or cooling liquid by connecting the lower outlets 3a with the upper inlets 4b through at least one first duct 11, connecting the upper outlets 3b with the lower inlets 4a through at least one second duct 12, and propelling the cooking or cooling liquid at least inside said first duct 11 by means of pumping means 13.

It is also a part of the present method to restrict a vertical circulation of the cooking or cooling liquid between the lower region 1a and the upper region 1b of tank 1 by interposing a plate 5 between them, allowing however the draining of the cooking or cooling liquid from both the lower and upper regions 1a, 1b through emptying means arranged in relation to the lower region 1a of tank 1 by providing perforations 6 in said plate 5.

The method of the invention also comprises arranging the food to be cooked-cooled in a plurality of support trays 15 that are stacked forming at least one lower stack 17a inside the lower region 1a and at least one upper stack 17b inside the upper region 1b, and accelerating and directing said transverse circulation of the cooking or cooling liquid by sizing said lower and upper stacks 17a, 17b so as to leave reduced spaces therearound inside tank 1. The method further comprises facilitating the transverse circulation through said lower and upper stacks 17a, 17b by including in each support tray 15 at least one configuration by way of a suitable channel for the transverse circulation of the cooking or cooling liquid from one side of the support tray 15 to the other even when the support tray 15 forms part of one of the lower or upper stacks 17a, 17b in one or the other of the lower and upper regions 1a, 1b of tank 1.

The application of the system and method of the present invention considerably increases the temperature distribution and recirculation speeds, while at the same time eliminating any type of fluid dynamic and thermal short-circuits inside the tank or boiler (that the system itself might create) thus maximizing the heat transfer between the heating or cooling liquid and the product to be heated or cooled. The efficiency of the cooking and cooling process also increases considerably with the reduction of the cooking and cooling times. Depending on the formats, said reduction can be between 15 and 25% in relation to traditional systems, which offers the possibility of increasing the number of treated batches per day. It also provides a great heat regularity within the entire boiler, thus ensuring the consistency and regularity of the heat process, which ensures the microbiological quality and safety of the end food product. Furthermore, the arrangement of a single steam nozzle protected by each region of the tank prevents irregular over-heating in some areas in the products. All of the above entails a lower energy cost of the process.

On the other hand, a direct steam feed provides 100% use of the energy (enthalpy) of the steam, since it is mixed directly by injection with the cooking water and since the losses corresponding to the steam-water heat transfer in heat exchangers, plus the corresponding and inevitable heat losses are prevented, which allows obtaining the desired cooking temperature quickly. Furthermore, the new design of the support trays of the molds in which the product is arranged allows a transverse circulation flow through the channels optimizing the forced convection and maximizing the energy efficiency and contributing to homogenizing the heat regularity.

The application of the system and method of the present invention to an installation like the one described in international patent application WO 03/096815, of this applicant, allows decreasing the daily production time depending on the production mixture proportion, opening up the possibility of using most of the calories and negative calories contained in the hot water after cooking and in the cold water after cooling, by means of storing it in the production tanks or boilers themselves, without requiring the large external deposits for storing and tempering the necessary fluids for the production of the following day in traditional installations.

A person skilled in the art will be able to introduce modifications and variations in the embodiments that are shown and described merely by way of a non-limiting and illustrative example without departing from the scope of the present invention as its is defined in the attached claims.

The invention claimed is:

1. A system for cooking-cooling food by immersion under forced and diffuse convection comprising:
    at least one tank for housing the food to be cooked-cooled,
    filling means for filling said tank with a cooking or cooling liquid,
    emptying means for draining said cooking or cooling liquid from the tank,
    and heating means for heating the cooking liquid,
    wherein the tank comprises one lower region having first and second lower side walls and one upper region having first and second upper side walls; and circulation means are provided for taking in cooking or cooling liquid from said lower region through at least one lower outlet located in a said first lower side wall and introducing it to said upper region through at least one upper inlet located in said first upper side wall and for taking in the cooking or cooling liquid from the upper region through at least one upper outlet located in said second upper side wall and introducing it to the lower region through at least one lower inlet located in said second lower side wall.

2. A system according to claim 1, wherein said first lower side wall is opposite to and facing said second lower side wall and said first upper side wall is opposite to and facing said second upper side wall to facilitate a transverse circulation of the cooking or cooling liquid in both the lower and upper regions in opposite directions which determines a forced convection of the cooking or cooling liquid.

3. A system according to claim 2, wherein the system further comprises a plurality of said lower outlets distributed in a significant area of said first lower side wall of the lower region, a plurality of said upper inlets distributed in a significant area of said first upper side wall of the upper region, a plurality of said upper outlets distributed in a significant area of said second upper side wall of the upper region, and a plurality of said lower inlets distributed in a significant area of said second lower side wall of the lower region for the purpose of diffusing said forced convection of the cooking or cooling liquid.

4. A system according to claim 3, further comprising a plate interposed between the lower region and the upper region of tank and adapted so as to restrict a vertical circulation of the cooking or cooling liquid between them.

5. A system according to claim 4, wherein said emptying means are arranged in relation to the lower region of tank, and said plate comprises perforations to allow draining the cooking or cooling liquid from both the lower and upper regions through the emptying means.

6. A system according to claim 3, further comprising a lower outlet chamber formed between the first lower side wall and a first outer side wall of the tank, communicated through a first duct with an upper inlet chamber formed between the first upper side wall and said first outer side wall, and an upper outlet chamber, formed between the second upper side wall and a second outer side wall of the tank, communicated through a second duct with a lower inlet chamber formed between the second lower side wall and said second outer side wall.

7. A system according to claim 6, further comprising pumping means connected to at least said first duct to propel the cooking or cooling liquid therein.

8. A system according to claim 7, wherein said pumping means are adapted so as create a diffuse transverse forced convection in a turbulent flow of the cooking or cooling liquid inside the lower and upper regions of the tank.

9. A system according to claim 1, wherein said heating means are arranged to heat the cooking liquid inside the tank.

10. A system according to claim 9, wherein said heating means comprise at least one steam inlet arranged to bubble steam through the cooking liquid inside the tank.

11. A system according to claim 9, wherein said heating means comprise a plurality of lower steam inlets arranged to bubble steam through the cooking liquid inside the lower region of the tank and a plurality of upper steam inlets arranged to bubble steam through the cooking liquid inside the upper region.

12. A system according to claim 11, wherein said lower steam inlets are arranged adjacent to said lower outlets and said upper steam inlets are arranged adjacent to said upper outlets.

13. A system according to claim 1, further comprising a plurality of support trays for supporting the food to be cooked-cooled, and the tank comprises lower supporting means for supporting at least one lower stack of said support trays inside the lower region and upper supporting means for supporting at least one upper stack of said support trays inside the upper region.

14. A system according to claim 13, wherein said lower and upper stacks are sized so as to leave reduced spaces therearound inside the tank to contribute to accelerating and directing the circulation of the cooking or cooling liquid.

15. A system according to claim 13, wherein each support tray includes at least one configuration acting as a channel suitable to facilitate the transverse circulation of the cooking or cooling liquid from one side of the support tray to the other even when the support tray forms part of one of the lower or upper stacks in one or the other of the lower and upper regions of the tank.

16. A system according to claim 15, wherein said configuration acting as a channel comprises at least one double bottom joined to a bottom of the support tray by transverse partitions, delimiting spaces for the transverse circulation of the cooking or cooling liquid.

17. A system according to claim 13, wherein the support trays are adapted so as to support the food to be cooked-cooled arranged in molds.

18. A system according to claim 1, wherein said tank has a side loading-unloading opening and comprises a hermetically sealing side sliding door.

19. A system according to claim 1, wherein said tank has an upper loading-unloading opening.

* * * * *